United States Patent
Lin et al.

(10) Patent No.: US 7,349,206 B2
(45) Date of Patent: Mar. 25, 2008

(54) NOTEBOOK COMPUTER EXPANSION MODULE

(75) Inventors: Shih-Wei Lin, Pan Chiao (TW); Wei-Tai Lin, Taoyuan Hsien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 429 days.

(21) Appl. No.: 11/119,806

(22) Filed: May 3, 2005

(65) Prior Publication Data
US 2006/0044752 A1 Mar. 2, 2006

(30) Foreign Application Priority Data
Aug. 31, 2004 (TW) .............................. 93126241 A

(51) Int. Cl.
*G06F 1/16* (2006.01)
(52) U.S. Cl. ...................... 361/686; 710/303; 710/304
(58) Field of Classification Search ........ 361/679–683, 361/686, 724, 725; 312/223.1, 223.2; 710/303, 710/304; 248/917–924
See application file for complete search history.

(56) References Cited
U.S. PATENT DOCUMENTS

| | | | | |
|---|---|---|---|---|
| D358,144 S | * | 5/1995 | Makaaki | ..................... D14/114 |
| 5,709,360 A | * | 1/1998 | Rosen | ..................... 248/278.1 |
| D512,066 S | * | 11/2005 | Solomon et al. | ........... D14/434 |
| 2003/0189812 A1 | * | 10/2003 | Yin et al. | .................... 361/686 |
| 2003/0223185 A1 | * | 12/2003 | Doczy et al. | ................ 361/680 |
| 2006/0061958 A1 | * | 3/2006 | Solomon et al. | ............ 361/686 |
| 2006/0061961 A1 | * | 3/2006 | Yin et al. | .................... 361/686 |

* cited by examiner

*Primary Examiner*—Lisa Lea-Edmonds
*Assistant Examiner*—Anthony Q Edwards
(74) *Attorney, Agent, or Firm*—Rabin & Berdo, PC

(57) ABSTRACT

A notebook computer expansion module is described. The notebook computer expansion module has a support rest, an adjusting handle, a cable, a base, and an adjustable rotational shaft. The adjusting handle coupled to one side of the support rest allows a user to operate conveniently the notebook computer expansion module. The cable is coupled between the adjusting handle and the adjustable rotational shaft for releasing the adjustable rotational shaft so as to rotate the support rest on the base. The adjusting shaft further includes a ratchet fixed on the base, a fixing device, and a fixing plate. The fixing device is coupled to the fixing plate when the fixing device is coupled to the ratchet so as to enhance an engagement strength between the fixing device and the ratchet.

9 Claims, 3 Drawing Sheets

NOTEBOOK COMPUTER EXPANSION MODULE

RELATED APPLICATIONS

The present application is based on, and claims priority from, Taiwan Application Serial Number 93126241, filed Aug. 31, 2004, the disclosure of which is hereby incorporated by reference herein in its entirety.

FIELD OF THE INVENTION

The present invention generally relates to a notebook computer expansion module. More particularly, the present invention relates to a rotatable notebook computer expansion module.

BACKGROUND OF THE INVENTION

Electronic technology and the computer industry are highly developed now. Portable electronic devices, such as notebook computers, are widely used. Due to weight and practicality requirements, portable devices tend to be lighter, thinner and smaller. The notebook computer is a successful product because, in spite of its small size, it is capable of doing powerful calculations with a great deal of digital data.

Due to high portability and ease of use, in combination with the high grade development of the central processing unit and peripheral devices, functionality and performance of the notebook computer are close to or beyond that of a desktop computer. Some computer users only buy a notebook computer, instead of a desktop computer. However, the lighter weight and smaller appearance dimensions limit some functions and the extensibility of the notebook computer.

Due to volume and weight limitations of the notebook computer, the notebook computer cannot install complete internal peripheral devices like a desktop computer can. Therefore, users normally utilize external peripheral devices to carry out some desired functions. The external peripheral devices have to be unplugged when users wish to carry the notebook computer out. Accordingly, repeated installations of the external peripheral devices are executed to utilize the external peripheral devices. A conventional notebook expansion module for easily connecting and expanding the notebook computer is designed to overcome the foregoing inconvenience.

However, some of the conventional notebook expansion modules utilize fixed backboards to support the notebook computers so that the conventional notebook expansion modules are too large to deliver and especially to hand-carry. Therefore, some of the conventional notebook expansion modules provide a movable backboard to support the notebook computer. However, since the supporting force of the conventional movable backboard is insufficient, users and the notebook computers are both in a dangerous situation.

SUMMARY OF THE INVENTION

One objective of the present invention is to provide a notebook computer expansion module with a safe, stable adjustable support rest to provide a user with a safe environment for operating a notebook computer.

Another objective of the present invention is to provide a notebook computer expansion module with a conveniently adjustable supporting reset to adjust a working angle of the adjustable support rest.

To accomplish the above objectives, the present invention provides a notebook computer expansion module. The notebook computer expansion module includes a support rest, an adjusting handle, a cable, a base, and an adjustable rotational shaft. The support rest is disposed, and removable from, the base. The adjusting handle couples to one side of the support rest and the support rest supports a notebook computer. One end of the cable couples to the adjusting handle and another end of the cable couples to the adjustable rotational shaft so as to allow unlocking of the adjustable rotational shaft, and then rotation of the support rest, by drawing the cable with the adjusting handle. Therefore, the notebook computer expansion module allows a user to adjust conveniently a working angle of the support rest.

The adjustable rotational shaft further includes a ratchet and a fixing device. The ratchet is fixed on the base and the fixing device is utilized to engage with the ratchet. The fixing device can disengage from the ratchet when the user moves the adjusting handle to draw the cable. The adjustable rotational shaft further includes a first shaft and a fixing plate. The fixing plate couples the support rest to the first shaft and the support rest is fixed on the fixing plate. The fixing device further includes a second shaft, a pawl, and a fixing arm. The second shaft couples to the fixing plate, and the pawl and the fixing arm can rotate thereon. The pawl is fixed to the fixing arm, and the fixing arm contacts one side of the fixing plate to increase an engagement strength between the pawl and ratchet teeth of the ratchet when the pawl is engaged with the ratchet teeth.

The adjustable rotational shaft further includes a cable arm to couple to the pawl, and another end of the cable, to increase a moment for rotating the pawl. Therefore, users can easily disengage the pawl from the ratchet teeth through the cable. The notebook computer expansion module further includes an expansion interface for coupling to computer peripheral devices and the base further includes at least one internal peripheral device, e.g. a hard disk, a floppy, or an optical disk drive, therein.

The notebook computer expansion module utilizes the adjusting handle and the cable to adjust conveniently the working angle of the support rest, and the fixing arm to contact with the fixing plate for increasing the engagement strength between the pawl and the ratchet teeth. In addition, the notebook computer expansion module further utilizes the cable arm to increase a moment to disengage easily the pawl from the ratchet teeth. Hence, a user can easily use one hand to adjust the working angle of the support rest and the support rest can support a heavier exterior force and/or a notebook computer.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
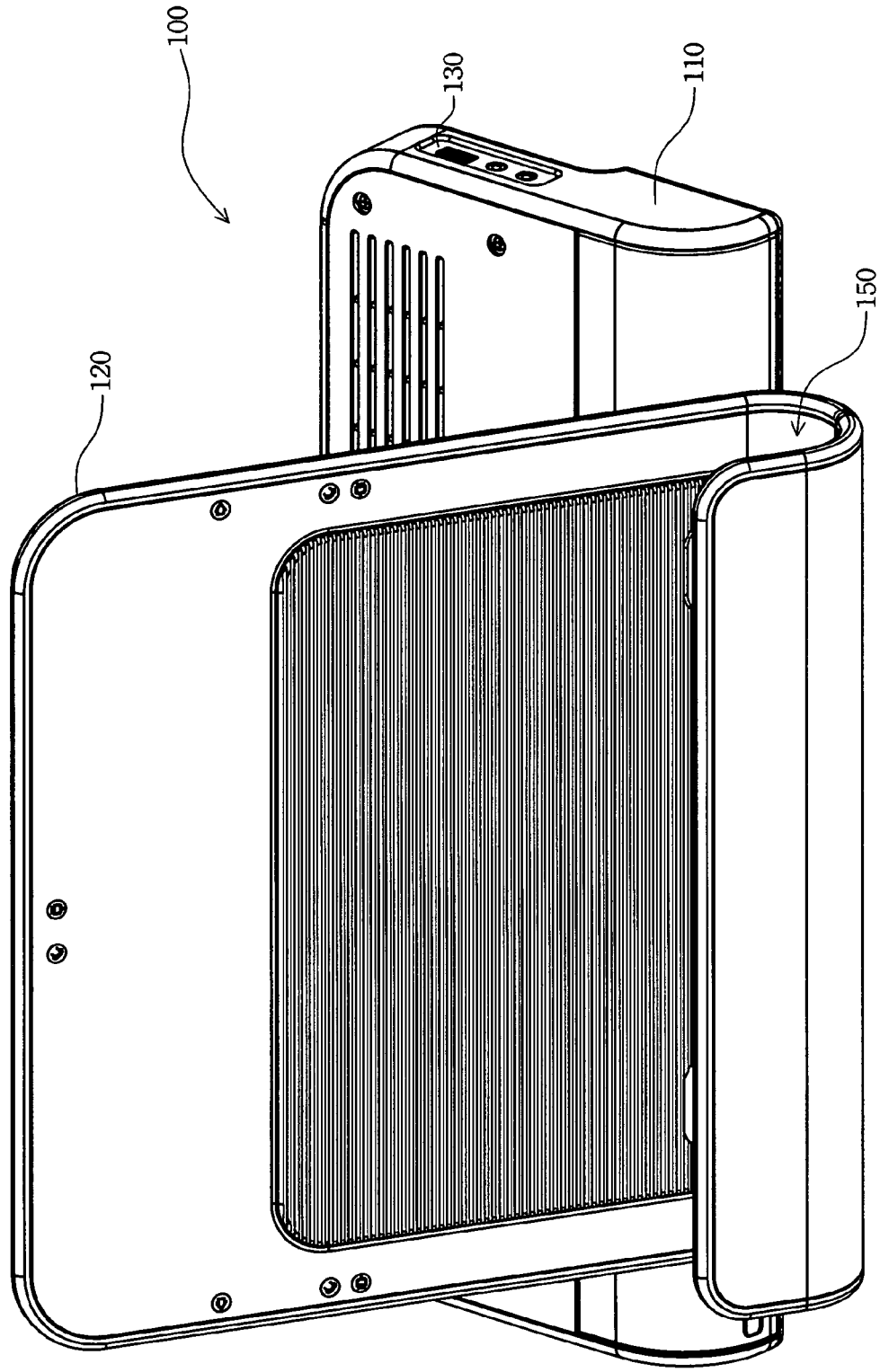
FIG. 1 is a schematic view of a preferred embodiment of a notebook computer expansion module according to the present invention.

FIG. 1 is a schematic view of a preferred embodiment of a notebook computer expansion module according to the present invention. The notebook computer expansion module 100 includes a base 110 and a support rest 120 able to adjust a working angle thereof according to the request of a user. The base 110 further includes an expansion interface 130 used to couple peripheral devices to a notebook computer (not shown) connected on the notebook computer expansion module 100. The base 110 can further install frequently used peripheral devices, such as, for example, a hard disk, a floppy, and/or an optical disk drive, therein. Consequently, after the notebook computer is connected to the notebook computer expansion module 100, the notebook computer can directly connect to and utilize the foregoing frequently used peripheral devices. A supporting corner 150 is configured at the bottom of the support rest 120 to support conveniently the notebook computer on the support rest 120; the support rest 120 can removable from the base 110.

Figure 2A:
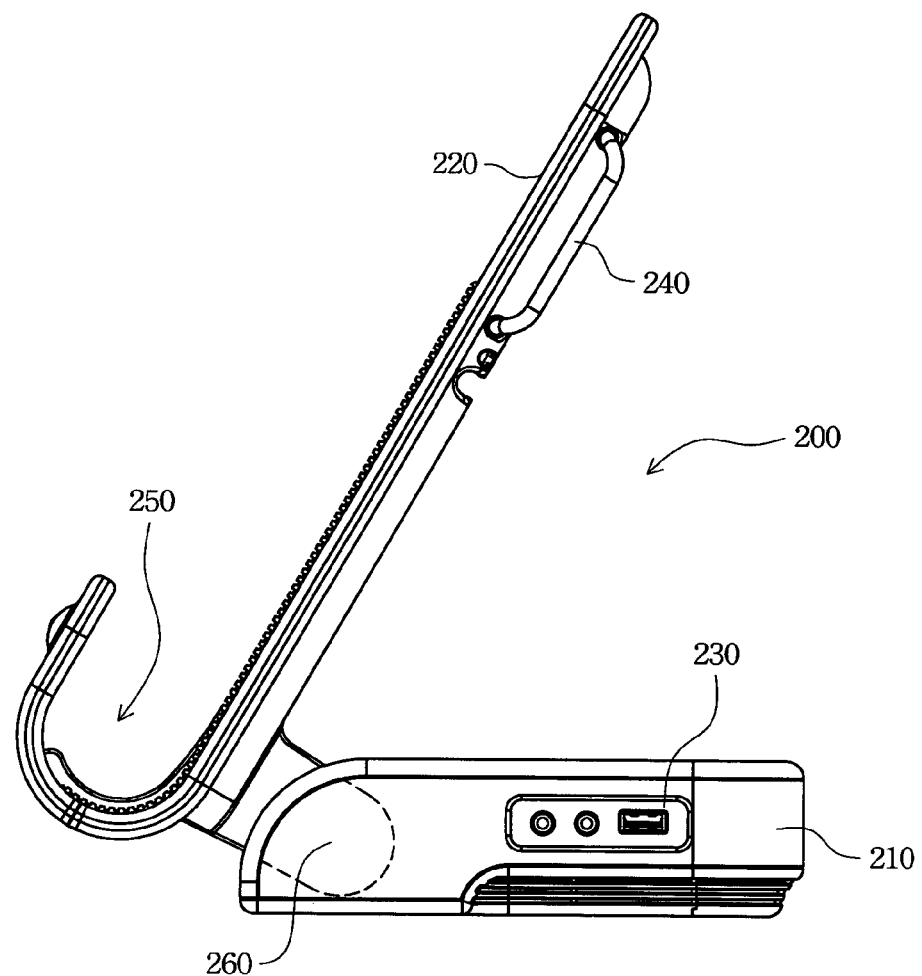
FIG. 2A is a schematic side view of FIG. 1 in use.
Figure 2B:
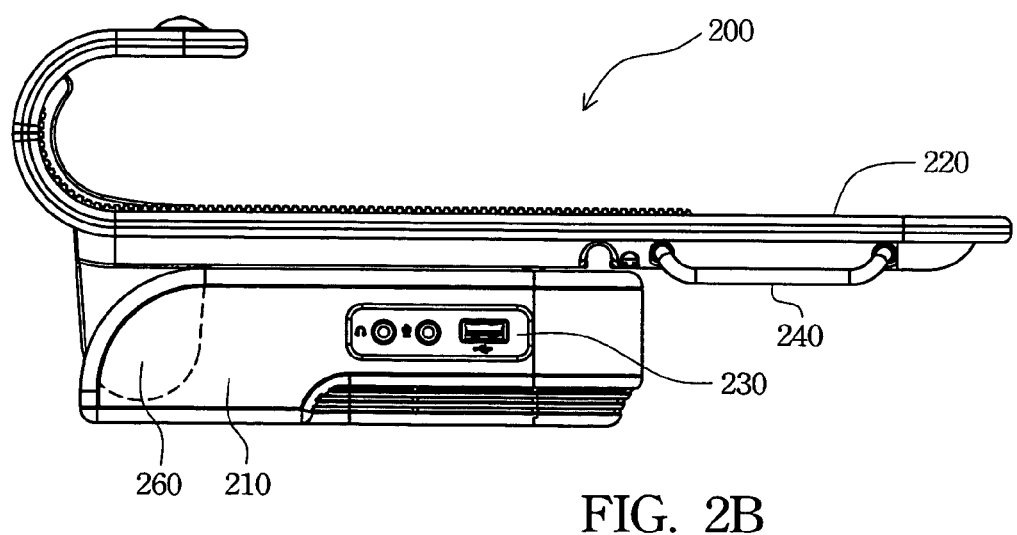
FIG. 2B is a schematic side view of FIG. 1 when stored.

Referring to FIGS. 2A and 2B, FIG. 2A is a schematic side view of FIG. 1 in use; that is, the support rest 220 is lifted up by a predetermined angle. FIG. 2B is a schematic side view of FIG. 1 when stored; that is, the support rest 220 is horizontally stored on the base 210. However, the notebook computer and the notebook computer expansion module 200 can be also operated when the support rest 220 is horizontally stored on the base 210.

The angle of the support rest 220 can be adjusted from the horizontal up to about 60 degrees according to the needs of the user. In addition, within the adjusting angle, the notebook computer expansion module 200 further provides about 8 steps where the support rest 220 can be fixed. Accordingly, a user can select a normal working angle for operating the notebook computer on the notebook computer expansion module 200. In addition, the notebook computer expansion module 200 further utilizes an adjusting handle 240 disposed behind the support rest 220 to release quickly and conveniently an adjustable rotational shaft 260 for adjusting the angle of the support rest 220. Therefore, a user can adjust the angle of the support rest 220 with only one hand. Additionally, the adjusting handles 240 can be disposed at both sides of the support rest 220 so as to be convenient for using either the left hand or right hand to adjust the angle of the support rest 220.

Figure 3A:
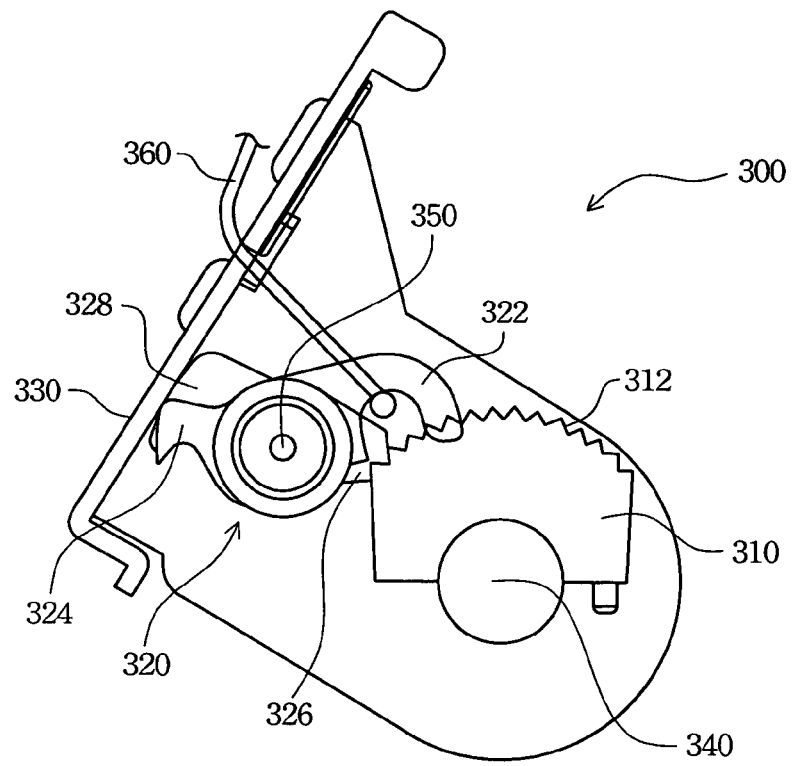
FIG. 3A is a schematic side view of an adjustable rotational shaft of the preferred embodiment of FIG. 1 in use.
Figure 3B:
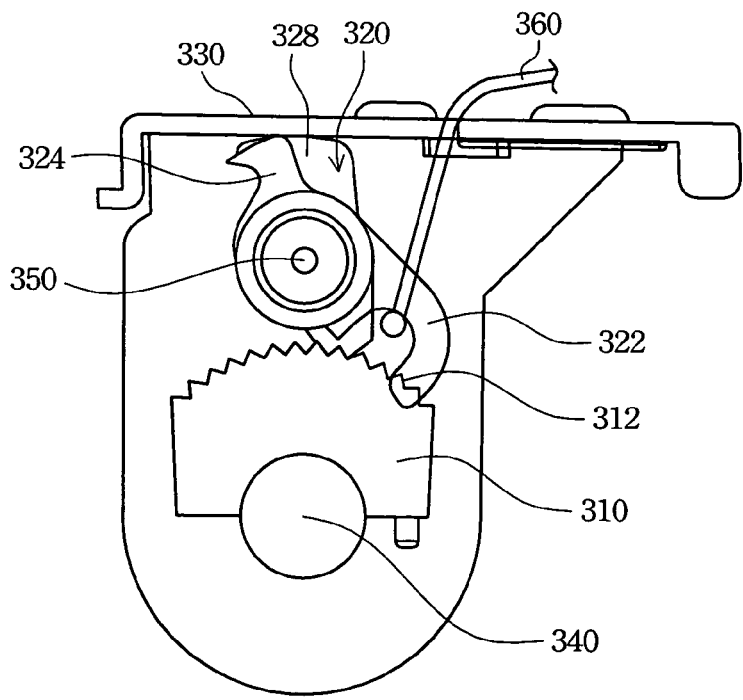
FIG. 3B is a schematic side view of an adjustable rotational shaft of the preferred embodiment of FIG. 1 when stored.

FIGS. 3A and 3B illustrate schematic side views of the adjustable rotational shaft of the preferred embodiment of FIG. 1. An angle of the adjustable rotational shaft of FIG. 3A corresponds to the angle of the support rest of FIG. 2A and the angle of the adjustable rotational shaft of FIG. 3B corresponds to the angle of the support rest of FIG. 2B. Referring to FIGS. 3A and 3B, the adjustable rotational shaft 300 includes a ratchet 310, a fixing device 320, a first rotational shaft 340, a second rotational shaft 350, a fixing plate 330, and a cable 360. One end of the cable 360 connects to a fixing device 320, and another end of the cable 360 connects to the adjusting handle behind the support rest (referring to FIGS. 2A and 2B). When the user operates the adjusting handle 240, the adjusting handle 240 draws the cable 360 to rotate the fixing device 320 around the second rotational shaft 350 and separate the fixing device 320 from the ratchet 310, so as to allow rotation of the support rest 220 fixed on the fixing plate 330 around the first rotational shaft 340 for adjusting the angle of the support rest 220 and the fixing plate 330. Until the support rest 220 reaches a desired working angle, the adjusting handle 240 is released to engage the fixing device 320 with the ratchet 310 again so as to fix effectively the fixing plate 330 and the support rest 220 at the desired angle.

Because the adjustable rotational shaft 300 of the notebook computer expansion module 200 according to the present invention adopts the ratchet 310 and the fixing device 320 to lock the adjustable rotational shaft 300, the support rest 220 of the notebook computer expansion module 200 can be adjusted upwardly or downwardly by only one hand, and also strongly supports the notebook computer, so as to provide a safe, steady environment for operating the notebook computer.

The fixing device 320 further includes a cable arm 322, an arresting arm 324, a pawl 326, and a fixing arm 328. The pawl 326 engages with ratchet teeth 312 of the ratchet 310 to provide a strong supporting force for the support rest 220. The cable arm 322 and the pawl 326 are linked together and the cable arm 322 is coupled to the cable 360 to provide a moment for rotating the pawl 326 of the fixing device 320. The arresting arm 324 and the fixing arm 328 contact a surface of the fixing plate 330 to prevent a further rotation of the fixing plate 330 around the first rotational shaft 340 when the pawl 326 engages with the ratchet teeth 312. The fixing arm 328 can further press on the surface of the fixing plate 330 to increase the engagement strength between the pawl 326 and the ratchet teeth 312 of the ratchet 310 when an additionally external force press on the fixing plate 330. Therefore, the fixing plate 330 can be effectively fixed at the desired angle for operating the notebook safely. The notebook computer expansion module according to the present invention can enhance the supporting force for support of the notebook computer, and prevent an angle variation when an external force acts on the fixing plate, allowing a user to operate the notebook computer on the notebook computer expansion module more safely and reliably.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A notebook computer expansion module, comprising:
   a base;
   a support rest disposed on the base and removable from the base;
   an adjusting handle coupling to one side of the support rest;
   a cable, wherein one end of the cable couples to the adjusting handle; and
   an adjustable rotational shaft coupling the support rest to the base, wherein the adjustable rotational shaft couples to another end of the cable, the adjusting handle draws the cable to unlock the adjustable rotational shaft, and the support rest rotates on the base for adjusting an angle of the support rest, wherein the adjustable rotational shaft further comprises:
a ratchet fixed on the base,
a fixing device engaging with the ratchet, wherein the fixing device disengages from the ratchet when the adjusting handle draws the cable to unlock the adjustable rotational shaft,
a first shaft coupling the adjustable rotational shaft to the base, and the support rest rotates on the base when the fixing device disengages from the ratchet, and
a fixing plate coupling the support rest to the first shaft, and the support rest is fixed on the fixing plate, the fixing device further comprising:
a second shaft coupling to the fixing plate,
a pawl coupling to the second shaft for engaging with ratchet teeth of the ratchet, and
a fixing arm fixed on the pawl, wherein the fixing arm contacts one side of the fixing plate to increase an engagement strength between the pawl and the ratchet teeth when the pawl is engaged with the ratchet teeth.

2. The notebook computer expansion module of claim 1, wherein the adjustable rotational shaft further comprises a cable arm for coupling to another end of the cable.

3. The notebook computer expansion module of claim 1, wherein the base further comprises an expansion interface for coupling to computer peripheral devices.

4. The notebook computer expansion module of claim 1, wherein the base further comprises at least one internal peripheral device therein.

5. The notebook computer expansion module of claim 4, wherein the internal peripheral device is a hard disk, a floppy, or an optical disk drive.

6. A notebook computer expansion module, comprising:
a base;
a support rest disposed on the base;
a ratchet fixed on the base;
a fixing device coupling to the support rest and engaging with the ratchet, wherein the fixing device further couples to a cable for disengaging the fixing device from the ratchet;
a first shaft coupling to the base;
a fixing plate coupling the support rest to the first shaft, wherein the support rest is fixed on the fixing plate, and the support rest rotates around the first shaft when the fixing device disengages from the ratchet;
an adjusting handle coupling to one side of the support rest and the cable to draw the cable for disengaging the fixing device from the ratchet; and
a pawl having a cable arm linked with the pawl, the cable arm being coupled to the cable to rotate the pawl.

7. The notebook computer expansion module of claim 6, wherein the fixing device further comprises:
a second shaft coupling to the fixing plate the pawl being coupled to the second shaft to engage with ratchet teeth of the ratchet; and
a fixing arm fixed on the pawl, wherein the fixing arm contacts one side of the fixing plate to increase an engagement strength between the pawl and the ratchet teeth when the pawl is engaged with the ratchet teeth.

8. The notebook computer expansion module of claim 6, wherein the base further comprises an expansion interface for coupling to computer peripheral devices.

9. The notebook computer expansion module of claim 6, wherein the base further comprises at least one internal peripheral device therein and the internal peripheral device is a hard disk, a floppy, or an optical disk drive.

* * * * *